June 24, 1969 — R. ADLER — 3,452,286
IMAGING APPARATUS
Filed Feb. 23, 1967
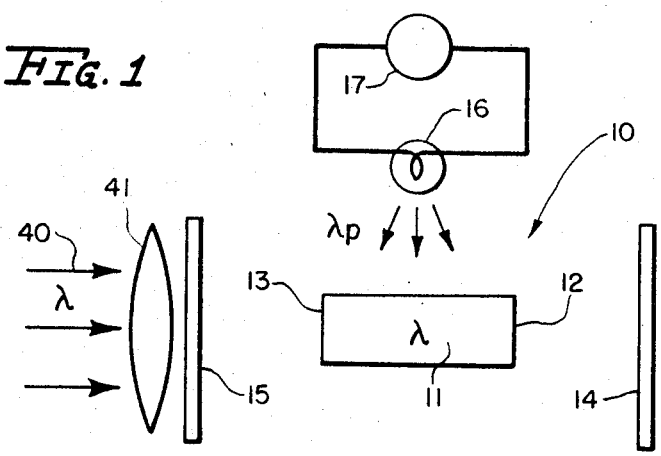
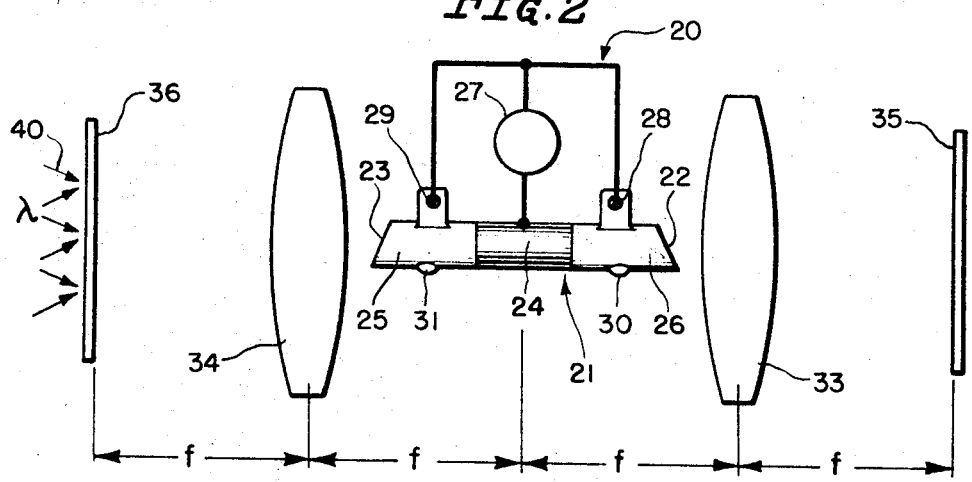
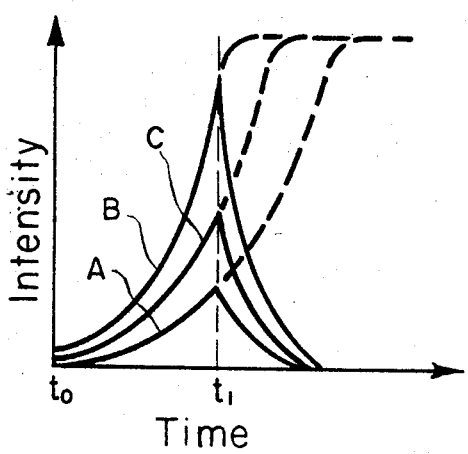
INVENTOR
Robert Adler
BY
ATTORNEY

United States Patent Office 3,452,286
Patented June 24, 1969

3,452,286
IMAGING APPARATUS
Robert Adler, Northfield, Ill., assignor to
Zenith Radio Corporation, Chicago, Ill.
Filed Feb. 23, 1967, Ser. No. 618,154
Int. Cl. H01s 3/02, 3/09
U.S. Cl. 330—4.3                    6 Claims

ABSTRACT OF THE DISCLOSURE

External radiation forms an image on one reflector of a conjugate laser. The laser is pumped with pulses of energy having an amplitude and duration such that the laser operates in a linear super-regenerative mode. The image appears in an amplified form on the laser reflectors.

---

The present invention pertains to imaging apparatus. More particularly, it relates to a laser system which is opearted as an image amplifier.

Conventional image amplifiers often take the form of a photocathode onto which an image is formed and from which a corresponding pattern of electrons is emitted. The electrons are accelerated to a phosphor screen in order to develop an amplified replica of the input image. Recently, attention has been directed to the properties of so-called conjugate lasers, in which individually different points on one reflector of a laser cavity are imaged onto respective points of the opposite reflector. If one of those reflectors is partially masked so as to spoil the lasing in spatial modes aligned with portions of the mask opaque to the laser radiation, a pattern corresponding to the mask may be observed on the other reflector. This technique has been called active imaging. It might find use, for example, in producing images of small metal parts or other objects with respect to which the device would be employed similarly to a shadowgraph.

It is a general object of the present invention to provide new and improved apparatus capable of amplifying weak images at a distance.

A more specific object of the invention is to provide a new and improved image amplifier which takes advantage of certain characteristics of the aforementioned active imaging technique.

Imaging apparatus in accordance with the present invention includes a laser having means including a pair of opposed reflectors effectively defining a conjugate optical cavity. The cavity embraces an active medium capable of degenerately developing radiation of predetermined wavelength in a plurality of spatial laser modes in response to the delivery to the medium of pumping energy. The intensity of that radiation tends to increase to saturation with continued delivery of the pumping energy. The apparatus further includes means for projecting onto a first of the reflectors input radiation of the same wavelength in a pattern defining an image. Finally, a source produces the pumping energy in a series of pulses each of an amplitude and duration activating the medium only to a degree at which the intensity of the developed radiation is less than the saturation level of the laser.

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements and in which:

FIGURE 1 is a schematic diagram of imaging apparatus constructed in accordance with the invention;

FIGURE 2 is a schematic diagram of imaging apparatus of a form preferred and alternative to that shown in FIGURE 1; and FIGURE 3 is a curve representing operational characteristics of the apparatus of FIGURES 1 and 2.

FIGURE 1 illustrates a laser 10 in which the active medium is a solid material such as ruby in the form of a cylindrical rod 11 having carefully ground parallel opposing end faces 12 and 13. The active medium is disposed within a cavity optically resonant at the laser radiation frequency and defined by opposing planar mirrors 14 and 15 individually spaced from end surfaces 12 and 13, respectively. The laser medium is activated by a source in the form of a lamp 16 productive of light which in the usual manner delivers pumping energy of wavelength $\lambda_p$ to the active laser medium. Lamp 16 is energized from a voltage source 17.

When the pumping energy is delivered to the active medium in laser 10, medium 11 develops radiation of a predetermined wave-length $\lambda$ and that radiation emerges from end faces 12 and 13 toward mirrors 14 and 15, respectively. This radiation is reflected back and forth between the mirrors through the active medium. The spacing between mirrors 14 and 15 is an integral multiple of half the radiation wavelength. As a result, the intensity of the developed radiation builds up cumulatively or regeneratively to a certain maximum or saturation level determined by the properties of the active medium itself and the reflectivities of mirrors 14 and 15. As an example of one of various alternatives, it has been suggested that end face 12 itself be so spaced and formed as to serve the function of reflector 14 which then is omitted.

Because end surfaces 12 and 13 are planar and rod 11 is a right cylinder, the radiation emerging from the end faces exhibits generally planar wavefronts. By virtue of the fact that these wavefronts are substantially parallel to mirrors 14 and 15, laser 10 operates in what may be defined as a pseudo-mode. For true conjugate-mode operation, radiation reflected from any one point on mirror 14 would be imaged onto a definite corresponding point on mirror 15, and vice versa. The same thing would be true when a plurality of such points were considered, so that a pattern of points on either one of the mirrors would be imaged onto the other. With the specific arrangement of FIGURE 1, however, the light in fact tends to gradually spread so that it only approximates a true conjugate laser system. Nevertheless FIGURE 1 illustrates the basic imaging components of the laser itself and may be considered effectively conjugate for low-tolerance uses.

Arrangements for achieving the condition of true conjugate imaging in an optical cavity are well under understood to the art, per se. A number of examples of such conjugate optical resonators in laser systems are disclosed and still others are cross referenced in an article entitled "Wide Field Active Imaging" by Myers et al. which appeared in the IEEE Journal of Quantum Electronics, vol. QE-2, No. 8, August 1966 at pp. 270–275.

One such arrangement of particular interest is that shown in FIGURE 2. In this instance, a laser 20 includes as its active element a cylindrical tube 21 containing a mixture of helium and mercury vapor as an active medium. Tube 21 is closed at its opposing ends with conventional Brewster windows 22 and 23. The central portion of tube 21 is a metallic cylinder 24 while the respective end portions 25 and 26 are of glass. Metal cylinder 24 serves as a cathode and is connected to one side of a potential source 27 the other side of which is connected in common to a pair of anodes 28 and 29 disposed in chambers communicating respectively with envelope portions 25 and 26. The latter portions also include small reservoirs 30 and 31 which hold reserve quantities of liquid mercury.

In operation, the application of a voltage between cathode 24 and anodes 28, 29 by source 27 results in a discharge within tube 21. The liquid mercury is thereby vaporized and stimulated or excited to develop radiation having a wavelength of 6150 A. This radiation emerges from window 22 and passes through a multi-element Tessar-type lens 33 to a planar reflector 35. At the same time, radiation emerging from window 23 passes through another Tessar lens 34 to a planar mirror 36. Tube 21 is disposed symmetrically between lens 33 and 34 and the latter are spaced apart by a distance equal to twice their focal length $f$; lenses 33 and 34 are also spaced respectively from mirrors 35 and 36 by this same focal length.

As a result of this arrangement, the system acts as a conjugate optical cavity resonant at the wavelength of the laser radiation and serving to image different points of mirror 35 onto respective different points of mirror 36 and vice versa. This particular form of conjugate optical cavity is described in further detail in the aforesaid Meyers article and the particular mercury-type hollow-cathode laser illustrated is described in more detail in an article entitled "Laser Emission in Ionized Mercury: Isotope Shift, Linewidth, and Precise Wavelength" by Byer et al. which appeared in the Journal of the Optical Society of America, vol. 55, No. 12, December 1965 at pp. 1598–1602.

In accordance with the invention, a psuedo-conjugate or conjugate laser system such as is illustrated in FIGURES 1 and 2 is caused to operate super-regeneratively and an image is projected onto one of the cavity-defining reflectors or mirrors. To enable super-regenerative oscillation, source 17 or 27 is caused to deliver a series of pulses of its pumping energy with each pulse being of an amplitude and duration such that the laser medium is activated only to a degree at which the intensity of the developed radiation is less than the saturation level of the laser. Thus, the laser itself serves as an incipient oscillator and the pumping source is modulated at that which is known as the quench frequency in the radio communications art.

That is, the active medium and its cavity constitute a regenerative oscillator which is controlled by the quenching of the pumping energy to have alternately positive and negative values of conductance. The quenching occurs at a frequency low with reference to the oscillation frequency of the laser. The operation is stable because the quench signal is of a duration such that the effective conductance of the laser has a positive value when integrated over a period of time long with respect to the period of quench signal. In this case, the super-regeneration is of the linear-mode type; the laser oscillations are not permitted, during the delivery of any pumping energy pulse, to achieve equilibrium or saturation level before being quenched by the termination of the pumping pulse.

Radiation is projected on to one of the reflectors in a pattern defining an image. This image-representative input radiation at least includes radiation of the same wavelength $\lambda$ as that developed by laser 10 or 20. Thus, as illustrated in FIGURE 1 the image pattern of input radiation, also of wavelength $\lambda$ and indicated in the drawing by arrows 40, is focused upon the external side of mirror 15 by a lens 41. In this case, mirror 15 is partially transparent of radiation at wavelength $\lambda$ so that a portion of the input image passes through mirror 15 and enters active element 11. Similarly in FIGURE 2, an image 40 is focused upon mirror 36.

At the beginning of each pulse of pumping energy, transient oscillations at the oscillatory frequency of the laser begin in each laser mode as the result of noise in the system. If no incoming radiation 40 is present at the point on mirror 15 or 36 corresponding to that mode, the amplitude of oscillation then builds up as shown in curve A of FIGURE 3, until termination of the pumping pulse at time $t_1$ stops the further growth of the amplitude and initiates its decay. Had the pumping pulse not been terminated, growth would have continued to saturation as indicated by the dashed portion of curve A.

A laser mode which corresponds to a point on mirror 15 or 36 where a substantial radiation signal varies does not start its buildup with noise but starts with the signal level. Buildup for the same period to time $t_1$ produces a much larger final amplitude as shown by curve B of FIGURE 3. In between, an intermediate level of incoming radiation representing an image halftone causes a buildup during the same period to an intermediate final amplitude as indicated by curve C. For each condition of input radiation level, the oscillation amplitude decays rather quickly as also shown in FIGURE 3.

The end result of this process is the development on both mirrors 14 and 15 or 35 and 36 of an amplified form of the input image. Halftones in that image, corresponding to the aforementioned area of intermediate intensity corresponding to curve C, retain their relative level of brightness in the amplified image so that shadings in contrast are preserved. This occurs because the super-regenerative mode of operation chosen does not permit saturation of the laser.

Thus, the amplitude of the exciting or input signal for any point at the start of each negative-conductance or lasing interval determines how quickly the oscillations aligned with that point build up to saturation. In the linear mode of operation here employed, the final amplitude of oscillation in each quench cycle manifests the amplitude of the applied signal at the start of each particular cycle. Consequently, the amplitude and duration of the pumping pulses from sources 17 or 27 are selected in view of the maximum brightness at any point in the input image so as to prevent the developed radiation along the conjugate axis corresponding to that brightest point from exceeding the saturation level. At the same time, it is to be noted that provision for adjustment of the length or the duration of the pumping pulses readily enables control of contrast in the resulting image. To this end, voltage source 17 preferably is adjustable in pulse amplitude or duration, or both.

In use, the amplified image may be observed on either the interior or exterior surfaces of mirrors 14 and 15 or 35 and 36. To observe that image on the exterior surface of one of mirrors 14 or 35, that mirror also is made partially transparent to the developed radiation. Alternatively with respect to the direction of incidence of the input image, it may in principle be projected onto the interior surface of either one of mirrors 14 and 15 or 35 and 36 in which case that mirror need not be partially transparent unless it is desired at the same time to observe the amplified image externally on that particular mirror.

The time interval between successive pumping pulses need only be that which permits a substantial cessation of the laser action. Moreover, the pulse repetition rate or the quench frequency in the typical application only need be sufficient so that the image appears continuous as viewed by the human eye. As known from television practice, a quench frequency of the order of 60 cycles per second is sufficient to permit the eye to integrate between successive pulses and thus appear to see a continuous image.

The input image to be projected upon the one mirror of the cavity may be created in a variety of different ways. In any event, the input radiation defining the image must include a sufficient component of radiation at the laser-radiation wavelength in order to stimulate the development of the latter; however, the input radiation may also include other wavelengths. In one arrangement for forming the image, the object is illuminated with radiation from the same laser and a reflected image is focused upon the input mirror.

The imaging apparatus described permits active imaging by use of a conjugate laser while yet preserving halftones in the image. A high level of image amplification is obtainable, and the degree of contrast in the image may be controlled. The techniques described are applicable to any of a wide variety of conjugate or near-conjugate laser systems and are applicable regardless of radiation wavelength, being suitable for example in any of the ultraviolet, visible and infrared regions of the spectrum.

While particular embodiments of the present invention have been shown and described, it is apparent that changes and modifications may be made therein without departing from the invention in its broader aspects.

I claim:
1. Imaging apparatus comprising:
 a laser having means including a pair of opposed reflectors effectively defining a conjugate optical cavity embracing an active medium capable of regeneratively developing radiation of predetermined wavelength in a plurality of spatial laser modes in response to the delivery to the medium of pumping energy, the intensity of said radiation tending to increase to saturation with continued delivery of said pumping energy;
 means for projecting onto a first of said reflectors input radiation of said wavelength in a pattern defining an image;
 and a source for applying to said laser pumping energy in a series of pulses having an amplitude and duration of such value that, in the presence of expected input radiation, the radiation developed by said laser attains less than saturation level within the duration of any such pulse and said pulses having a time separation of sufficient duration that the radiation of said laser is quenched in the interval between pulses.
2. Apparatus as defined in claim 1 in which at least one of said reflectors is partially transparent to radiation of said wavelength.
3. Apparatus as defined in claim 2 in which said projecting means directs said input radiation onto the side of said one reflector external to said cavity.
4. Apparatus as defined in claim 3 in which said other reflector also is partially transparent to radiation of said wavelength and an image in said pattern appears on the side of said other reflector external to said cavity.
5. Apparatus as defined in claim 1 in which said projecting means illuminates an object with said radiation and focuses a reflected image of said object upon said first reflector.
6. Apparatus as defined in claim 1 in which the repetition rate of the energy pulses from said source is less than the persistence of vision.

References Cited

Lanczi, "Applied Optics," February 1965, p. 255.

JOHN KOMINSKI, *Primary Examiner.*

DARWIN R. HOSTETTER, *Assistant Examiner.*

U.S. Cl. X.R.

250—213; 331—94.5